United States Patent Office 3,473,869
Patented Oct. 21, 1969

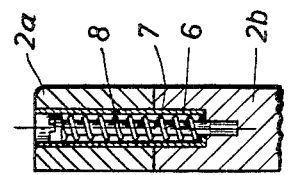
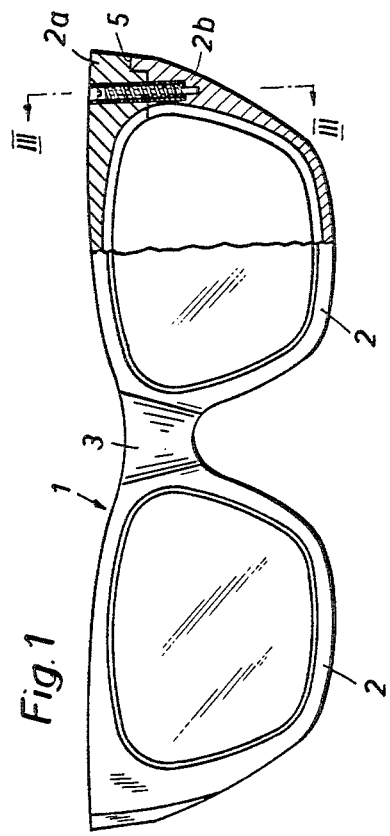
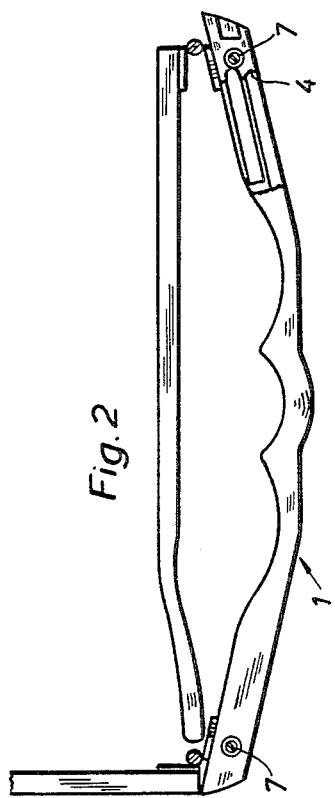

3,473,869
EYEGLASS HAVING EXPANSIBLE RIMS
Wolf Pluznik and Gino Frescura, Zurich, Switzerland, assignors to Schweizerische Unfall-Versicherungsanstalt, Lucerne, Switzerland
Filed Feb. 28, 1966, Ser. No. 530,632
Claims priority, application Switzerland, Mar. 2, 1965, 2,832/65
Int. Cl. G02c *1/08, 5/00*
U.S. Cl. 351—95      4 Claims

ABSTRACT OF THE DISCLOSURE

An eyeglass frame in which each section surrounding the opening for a lens is divided along a break area to permit relative displacement of the portions on opposite sides of the break area to remove or insert a lens, the portions having aligned bores extending along a line crossing the break area, there being a spring-loaded securing means in the bores resiliently connecting the portions to enable resilient displacement of the portions away from one another to permit removal or insertion of a lens, whereafter the portions are resiliently urged together along the break area by the securing means.

---

The present invention relates to an improvement in eyeglass and goggle frames the lenses of which can be changed.

An object of the invention is to provide an improvement in frames for eyeglasses and goggles for enabling change of the lenses or glasses without tools, wherein a resilient means for holding together the two portions of the frames is located entirely within the frames.

This and further objects of the invention will be apparent from the following detailed description, with reference to the accompanying drawings, wherein:

FIGURE 1 is a front view, partly in cross section, of eyeglass frames employing the invention;

FIGURE 2 is a top view, partly broken away, of the frames of FIGURE 1; and

FIGURE 3 is a cross sectional view taken along line III—III of FIGURE 1.

Referring to FIGURES 1 and 2, there is shown an eyeglass frame 1 which includes two sections 2 for mounting the lenses and which are connected together by a bridge 3. The lenses are held in grooves 4 in a known manner. Each section 2 can be spread apart along a break area 5, located at the outside of each portion, for the purpose of inserting or removing the lenses. The break area 5 can be stepped, as illustrated.

As best shown at FIGURE 3, each section 2 has a bore perpendicular to the break area 5 and extending from the surface of upper portion 2a through the area 5 and part way into the lower portion 2b which terminates at the area 5. The bore or other opening is thus integral with the frames. A sleeve 6 having at its lower end a bottom with a central aperture is provided in the bore. The sleeve is anchored in portion 2a but not in portion 2b. The sleeve is largely occupied by a screw or other suitable means 7 that extends through the central aperture of the sleeve bottom and is screwed into the material of portion 2b or otherwise therein anchored. A compression spring 8 encircling the screw 7 presses upon the head of the screw and upon the sleeve bottom. Thus, the sleeve 6 is movable relative to the screw 7. The unreferenced groove immediately behind groove 4 is for the purpose of storing a protective side piece and is not concerned with the invention.

By slightly spreading apart the portions 2a, 2b the sleeve is caused to move with respect to the screw, compressing the spring and affording sufficient play to permit removal or insertion of the lens. As soon as the portions 2a, 2b are released they are forced together under action of the compressed spring, thereby securing the lens in place.

With the frames of the invention, lenses can be replaced or new lenses substituted without the need of tools. The wearer for eyeglasses with these frames can himself easily change or replace lenses.

The frames of the present invention are useful in spectacles of all kinds, including corrective, industrial, sun, and shooting glasses.

The invention is particularly advantageous in industrial safety glasses, where the damaged lenses or glass must be frequently replaced.

The invention is also applicable to goggles for various uses, where it is desirable to be able to replace the glasses or lenses of the goggles.

The invention is not limited to frames of any particular design or material, it simply being necessary that the frames provide sufficient room for a bore and that the material, whether metal or synthetic plastic, be sufficiently flexible to permit the necessary separation of the portion 2a, 2b.

It will be appreciated that the sleeve 6 need not extend into portion 2b.

We claim:

1. A frame for eyeglasses and spectacles enabling change of lenses without tools, said frame comprising first and second interconnected sections defining respective openings for receiving a respective lens, each section being separable along a break area extending from the opening for the lens to the outer surface of the frame to divide such section into first and second mating portions which are relatively displaceable at the break area to enable removal and insertion of lenses in said openings, each portion of said sections having an aligned bore extending along a line crossing the associated break area, a separate sleeve in each section extending in the bores thereof, each sleeve being secured to one portion and slidable in the other portion of its respective section, said sleeve having a bottom bearing against said other portion, said sleeve having an opening in said bottom, an anchor passing through said opening in the bottom of the sleeve and secured in said other portion, said anchor extending slidably within the sleeve and including a head disposed at a level within said one portion when said portions are in abutment along the break area, the sleeve and anchor being wholly confined within the outline of the frame, and a compression spring encircling said anchor and acting on the head thereof and on said bottom of the sleeve to permit relative displacement of the portions away from one another against the action of the spring.

2. A frame as claimed in claim 1 wherein said bores extend perpendicular to the respective break areas.

3. A frame as claimed in claim 1 wherein said break area has a step therein.

4. A frame as claimed in claim 1 wherein said anchor is a screw threadably engaged in said other portion.

References Cited

UNITED STATES PATENTS

| | | | |
|---|---|---|---|
| 1,424,828 | 8/1922 | Kirstein et al. | 351—111 |
| 1,582,898 | 5/1926 | Bobrow. | |
| 2,914,986 | 12/1959 | Zakin | 351—102 |

FOREIGN PATENTS

| | | |
|---|---|---|
| 704,179 | 2/1954 | Great Britain. |
| 428,481 | 6/1911 | France. |

DAVID SCHONBERG, Primary Examiner
J. W. LEONARD, Assistant Examiner

U.S. Cl. X.R.

351—140